United States Patent Office 3,112,333
Patented Nov. 26, 1963

3,112,333
ORGANOFUNCTIONAL SILOXANES
Donald L. Bailey, Snyder, N.Y., assignor to Union Carbide Corporation, a corporation of New York
No Drawing. Filed Oct. 7, 1960, Ser. No. 61,103
1 Claim. (Cl. 260—448.2)

This invention relates to novel organosilicon compounds. More particularly, this invention relates to linear beta-carbohydrocarbonoxyethylsiloxanes having the formula:

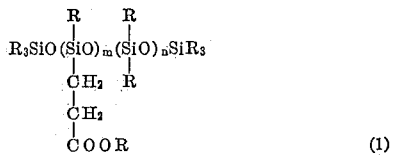
(1)

wherein R is a monovalent hydrocarbon group, m has a value of at least one and n has a value from 0 to 1000 inclusive.

Illustrative of the groups represented by R in Formula 1 are the linear alkyl groups (for example the methyl, ethyl, propyl, butyl and octadecyl groups), the cyclic alkyl groups (for example the cyclohexyl and cyclopentyl groups, the linear alkenyl groups (for example the vinyl and the allyl groups), the cyclic alkenyl groups (for example the cyclopentenyl and the cyclohexenyl groups), the aryl groups (for example the phenyl and naphthyl groups), the alkaryl groups (for example the tolyl group) and the aralkyl groups (for example the benzyl and beta-phenylethyl groups).

Illustrative of the beta-carbohydrocarbonoxyethylsiloxanes of this invention are the following compounds:

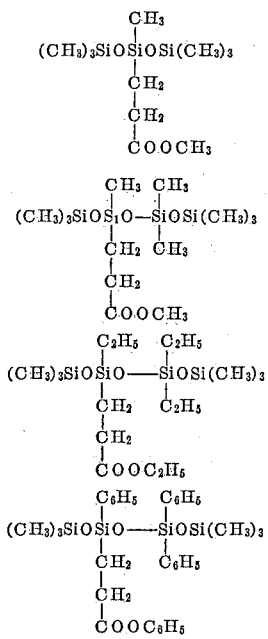

and

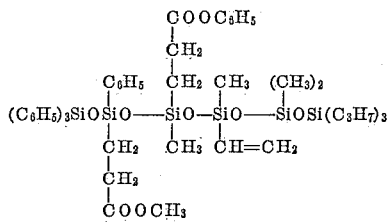

The preferred beta-carbohydrocarbonoxyethylsiloxanes of this invention are beta-carbalkoxyethylsiloxanes represented by Formula 1 wherein R is an alkyl group containing from 1 to 20 carbon atoms inclusive or, more preferably, from 1 to 10 carbon atoms inclusive, $m$ has a value from 1 to 10 inclusive and $n$ has a value from 0 to 50 inclusive.

The beta-carbohydrocarbonoxyethylsiloxanes of this invention can be produced by an addition process which involves reacting a hydrocarbyl acrylate ester having the formula:

$$CH_2=CHCOOR \qquad (2)$$

wherein R has the above-defined meaning and a hydrogensiloxane having the formula:

(3)

wherein R, m and n have the above-defined meanings to produce a beta-carbohydrocarbonoxyethylsiloxane. This process is conducted at a temperature from 80° C. to 180° C. and in the presence of from 0.001 to 5 parts by weight of platinum (e.g. in the form of finely divided platinum supported on charcoal or, preferably, the gamma allotrope of alumina) per 100 parts by weight of the starting ester and the starting siloxane. The beta-carbohydrocarbonoxysiloxanes so produced can be isolated by any suitable conventional method (e.g. by extraction, filtration or fractional distillation or any combination of these methods). Hydrocarbyl acrylate esters that are suitable for use as starting materials in this process include methyl, ethyl, propyl, butyl, phenyl and benzyl acrylate. Hydrogensiloxanes that are suitable for use as starting materials in this process include:

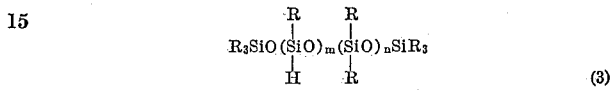

The addition process which can be employed to produce the beta-carbohydrocarbonoxyethylsiloxanes of this invention is preferably used to produce those siloxanes represented by Formula 1 wherein R is a monovalent hydrocarbon group free of aliphatic carbon to carbon multiple bonds (i.e. olefinic and acetylenic bonds) since such bonds may react during the process.

The beta-carbohydrocarbonoxyethylsiloxanes of this invention can also be prepared by an alcoholysis process which involves reacting a beta-cyanoethylsiloxane having the formula:

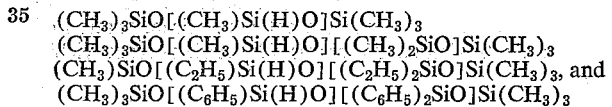
(4)

wherein R, m and n have the above-defined meanings with an alcohol (e.g. methanol, ethanol or allyl alcohol) and hydrochloric acid to produce a siloxane of this invention. A hydrocarbyl chloride and ammonium chloride are produced as by-products. Temperature from 50° C. to 70° C. can be used in this reaction and the desired siloxane can be isolated by fractional distillation. A typical beta-cyanoethylsiloxane represented by Formula 4 is the siloxane:

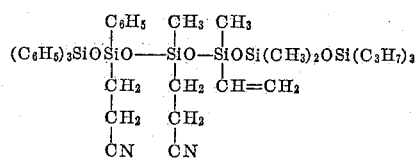

The starting beta-cyanoethylsiloxanes represented by Formula 4 can be produced by (a) reacting a suitable hydrogenhalosilane (e.g. CH$_3$Si(H)Cl$_2$) with acrylonitrile employing the conditions described above for the addition process to produce a beta-cyanoethylhalosilane (e.g. NCCH$_2$CH$_2$Si(CH$_3$)Cl$_2$), (b) reacting the beta-cyanoethylhalosilane so produced with an alcohol (e.g. ethanol) by conventional procedures to produce a beta-cyanoethylalkoxysilane

[e.g. NCCH$_2$CH$_2$Si(CH$_3$)(OC$_2$H$_5$)$_2$]

and (c) co-hydrolyzing and co-condensing the beta-cyanoethylalkoxysilane with one or more suitable hydrocarbonalkoxysilanes [e.g. with (CH$_3$)$_3$SiOC$_2$H$_5$ or with a mixture of (CH$_3$)$_3$SiOC$_2$H$_5$ and (CH$_3$)$_2$Si(OC$_2$H$_5$)$_2$ and/or (CH$_3$)(CH$_2$=CH)Si(OC$_2$H$_5$)$_2$] by conventional procedures to produce a beta-cyanoethylsiloxane represented by Formula 4.

The beta-carbohydrocarbonoxyethylsiloxanes of this invention can be employed as hydraulic fluids (e.g. in braking devices). In addition, these siloxanes can be reacted through their carbohydrocarbonoxy groups with alkyd polymers containing hydroxyl groups to improve the water repellency of coatings produced from the polymers.

The following examples illustrate the present invention:

*Example I*

Into a one liter flask equipped with stirrer, reflux condenser, and dropping funnel, were charged 111 grams (0.5 mole) of [(CH$_3$)$_3$SiO]$_2$Si(CH$_3$)H and 1.5 grams of one percent platinum-on-gamma-alumina catalyst. After heating the mixture to 140° C., 69 grams (0.8 mole) of CH$_2$=CHCOOCH$_3$ was added via the dropping funnel over a period of four hours. The resulting mixture was heated for an additional five hours at 140–150° C. The reaction mixture was then cooled to room temperature and centrifuged to remove the catalyst. Fractionation of the products yielded 39 grams (25 mole-percent yield) of

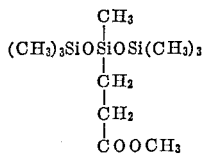

The adduct yielded the following physical and analytical data:

Boiling point—40–42°C./0.2 mm.
Refractive index (n$_D$$^{25}$)—1.4046

|  | Percent C | Percent Si | Percent H | Saponification equivalent meq. per gram |
|---|---|---|---|---|
| Found | 41.2 | 27.2 | 8.9 | 3.1 |
| Theoretical | 42.8 | 27.2 | 9.1 | 3.2 |

*Example II*

When one mole of methyl acrylate is mixed with one mole of the hydrogensiloxane having the formula (CH$_3$)$_3$SiO[(CH$_3$)Si(H)O][(CH$_3$)$_2$SiO]Si(CH$_3$)$_3$ and finely divided platinum supported on the gamma allotrope of alumina (1 part by weight of platinum per 100 parts by weight of the methyl acrylate and the hydrogensiloxane), the mixture is heated at 150–170° C. for five hours, the mixture is filtered to remove the platinum catalyst and the filtrate so obtained is fractionally distilled, there is produced a siloxane of this invention having the formula:

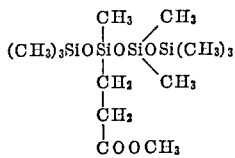

The siloxane so produced can be identified by conventional elemental and infra-red analysis.

*Example III*

When one mole of phenyl acrylate is mixed with one mole of hydrogensiloxane having the formula (CH$_3$)$_3$SiO[(C$_6$H$_5$)Si(H)O][(C$_6$H$_5$)$_2$SiO]Si(CH$_3$)$_3$ and finely divided platinum supported on the gamma allotrope of alumina (1 part by weight of platinum per 100 parts by weight of the phenyl acrylate and the hydrogensiloxane), the mixture is heated at 150–170° C. for five hours, the mixture is filtered to remove the platinum catalyst and the filtrate so obtained is fractionally distilled, there is produced a siloxane of this invention having the formula:

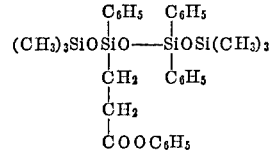

The siloxane so produced can be identified by conventional elemental and infra-red analysis.

This application is a continuation-in-part application of application Serial No. 703,251, filed December 17, 1957, now United States Patent No. 2,967,876.

The beta-carbohydrocarbonoxyethylsiloxanes of this invention, when compared with higher homologous carbohydrocarbonoxyalkylsiloxanes (e.g. gamma-carbohydrocarbonoxyalkylsiloxanes) and when compared with beta-carbohydrocarbonoxyethylsiloxanes wherein the beta-carbohydrocarbonoxyethyl group is bonded to a trifunctional silicon atom, were found to be surprisingly less stable at elevated temperatures (e.g. 150–200° C.) particularly under acidic and basic conditions. That is, the beta-carbohydrocarbonoxyethyl groups in the siloxanes of this invention are more prone to be cleaved from silicon (e.g. when mixed with aqueous acid solutions and heated) with the substitution of a silicon to oxygen to silicon bond for the beta-carbohydrocarbonoxyethyl to silicon bond. This property of the siloxanes of this invention can be used to advantage to introduce additional silicone functionality into systems containing these siloxanes.

What is claimed is:
A siloxane having the formula:

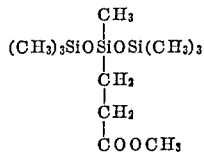

References Cited in the file of this patent
UNITED STATES PATENTS 2,957,899    Black et al.    Oct. 24, 1960

FOREIGN PATENTS 1,153,312    France    Sept. 30, 1957
788,842    Great Britain    Jan. 8, 1958

OTHER REFERENCES

Speier et al.: "Jour. Am. Chem. Soc.," vol. 79, (Feb. 20, 1957), pp. 974–9.